3,067,205
METHOD OF MAKING PYRIDINE ALDEHYDES
Robert H. Callighan, Pittsburgh, and Myron H. Wilt, Monroeville, Pa., assignors to United States Steel Corporation, a corporation of New Jersey
No Drawing. Filed Oct. 12, 1960, Ser. No. 62,074
1 Claim. (Cl. 260—297)

This invention relates to the making of pyridine aldehydes and, in particular, to a simple, direct method for making the desired product in good yield at low cost.

The pyridine aldehydes are valuable chemicals having a variety of uses, both directly and as intermediates in further syntheses. Pyridine-2-aldoxime methiodide, for example, is effective for overcoming the neuromuscular block which occurs in nerve-gas poisoning. Pyridine-4-aldehyde is an intermediate in the synthesis of isonicotinic-acid hydrazide, a compound characterized by its tuberculostatic activity. Because of the importance of such compounds, an economical source of these aldehydes based or readily available chemicals is highly desirable.

Our invention utilizes the ozonation of vinylpyridines to produce pyridine aldehydes directly. The ozonation of 2-vinylpyridine has been tried heretofore but produced only picolinic acid and formaldehyde. We have discovered that, by careful control of the reaction conditions, we can produce pyridine aldehydes by ozonation of vinylpyridines, if the reaction mixture is treated with a suitable reducing agent.

In summary terms, our process comprises dissolving a vinylpyridine compound having a preferentially ozonizable double bond, in a substantially anhydrous $C_1$ to $C_{10}$ aliphatic alcohol which is liquid at ozonation temperature, passing an ozone-containing gas through said solution at a temperature from about −100 to about 0° C., then treating the solution with a suitable reducing agent.

The starting materials for the present invention are vinylpyridines which have a preferentially ozonizable aliphatic double bond. Representative compounds of this nature which may be used alone or in admixture include, for example, 2-vinylpyridine, 3-vinylpyridine, 4-vinylpyridine and substituted vinylpyridines including 5-ethyl-2-vinylpyridine, 6-methyl-2-vinylpyridine, and 2-methyl-5-vinylpyridine. All these compounds are preferentially reactable with ozone at the aliphatic double bond, and have the formula:

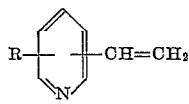

wherein R is selected from the group consisting of hydrogen and alkyl and aryl groups.

Certain substituted vinylpyridines, i.e., those containing functional groups such as hydroxyl, aldehyde, mercapto, ether or amino groups, which activate the ring of the pyridine nucleus or which themselves are reactive with ozone, are not suitable for use in our method.

In accordance with our invention, a vinylpyridine compound of the described nature is dissolved in a substantially anhydrous $C_1$ to $C_{10}$ monohydroxyl aliphatic alcohol. Representative alcohols of this nature which may be used alone, or in admixture, include alcohols such as methanol, ethanol, propanol, isopropanol, butanol, isobutanol, amyl alcohol, isoamyl alcohol, hexyl alcohol, heptyl alcohol, octanol, nonyl alcohol and decanol. It is generally preferable to use from about 0.1 to 1 mol of vinylpyridine compound per liter of alcohol, although greater amounts up to about 4 mols of vinylpyridine may be employed, if desired. An ozone-containing gas is passed through the resultant solution in order to bring about a reaction involving the ozone, the vinylpyridine, and the alcoholic solvent. The ozone-containing gas should preferably comprise from about 1 to 10 weight percent of ozone in admixture with other gaseous components such as pure oxygen, air, etc., and is passed through the solution at a suitable rate such as 100 to 5000 liters of gas per liter of solution per hour. For best results, it is preferable to use from about 100 to about 2000 liters of gas per liter of solution per hour. Normally from about 1 to 2 and generally from about 1.0 to 1.1 mols of ozone per mol of vinylpyridine compound are required to bring this reaction to completion, and the ozone-containing gas should be passed through the reaction mixture for a period of time sufficient to permit the absorption of such an amount of ozone.

The resulting solution is treated with a suitable reducing agent whereby there is formed a pyridine aldehyde having the formula:

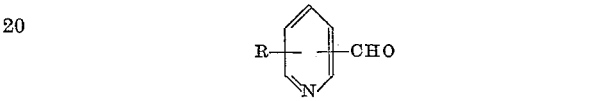

where R is selected from the group consisting of hydrogen and alkyl and aryl groups.

The reaction may be represented thus:

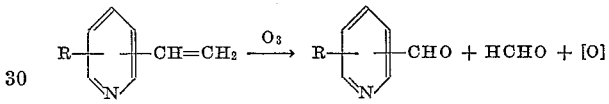

A wide variety of reducing agents may be used in accordance with the present invention, alone or in compatible admixture. Thus, for example, reducing agents such as the iodides of sodium, potassium, magnesium, calcium, barium, lithium, ammonium, strontium, cesium, rubidium may be used as well as sodium bisulfite. At least a chemically equivalent amount of such a reducing agent should be employed. The reducing agent combines with any active oxygen and thus prevents further oxidation of the pyridine aldehyde to pyridinecarboxylic acid. The reduction reaction should be conducted at a temperature within the range of about −100 to about 0° C. Generally speaking, it is preferable to employ a temperature of about 0 to −60° C. when an alcoholic solvent is employed. When the reduction reaction has gone to completion, there is formed a solution of a pyridine aldehyde in the alcohol. The aldehyde is recovered therefrom in any suitable manner, such as by removal of the solvent, e.g., by evaporation, extraction with ether, or by other suitable means.

The details of our process may be more fully understood from the following explanation of typical examples.

*Example 1*

A solution of 2-vinylpyridine (10.5 grams; 0.1 mol) in methanol (100 ml) was treated with approximately 2.3 weight percent ozone (in oxygen) at a temperature of −40° C. and a flow rate of 102 liters per hour for one hour and 33 minutes. Under these conditions, 4.8 grams (0.1 mol) of ozone was passed into the solution. To the cold colorless solution was added immediately a solution of sodium sulfite (12.6 grams; 0.1 mol) in 75 ml of water. An exothermic reaction occurred and the mixture rapidly became warm. After cooling to room temperature, the methanol was removed under an air blast. Saturated sodium-chloride solution (25 ml.) was added, and the aqueous solution was extracted with six 25-ml. portions of ether. The combined ether extracts were dried over anhydrous sodium sulfate and evaporated to dryness, yielding 7.0 grams (65.3% yield) of pyridine-2-aldehyde (also called picolinaldehyde). The aldehyde was identified by comparison of its infrared spectrum with that of an authentic sample.

*Example 2*

The ozonation was carried out as described above, except that after ozonolysis a mixture of potassium iodide (15 grams) and glacial-acetic acid (10 ml.) was added to the cold solution. Immediate iodine formation occurred accompanied by a gradual elevation in temperature to that of the room. After one hour, the iodine was reduced with 40% sodium-thiosulfate solution (75 ml.) and the resulting solution placed under an air blast. When most of the methanol had been removed, the aqueous solution was extracted with six 25-ml. portions of ether. The combined ether extracts were dried over anhydrous sodium sulfate and evaporated to dryness, yielding 6.5 grams (60.7% yield) of pyridine-2-aldehyde.

*Example 3*

The ozonation was carried out as described in Example 1, except that the compound ozonized was 4-vinylpyridine (0.1 mole). Following the aforementioned work-up of Example 1, there was obtained 5.3 grams (4.5% yield) of pyridine-4-aldehyde (also called isonicotinaldehyde). The aldehyde was identified by comparison of the infrared spectrum with that of an authentic sample.

*Example 4*

The ozonation was carried out as described in Example 1, except that the compound ozonized was 2-vinyl-5-ethyl-pyridine (0.1 mole). Following the aforementioned work-up of Example 1, there was obtained 8.6 grams (63% yield) of 5-ethylpyridine-2-aldehyde. An elemental analysis was obtained on the oxime, which melted at 147 to 148° C. The results of analysis compared with calculated percentage compositions as follows: Calculated for $C_8H_{10}ON_2$: C, 63.77; H, 6.67; N, 18.66. Found: C, 63.40; H, 6.75; N, 18.77.

*Example 5*

The ozonation was carried out as described in Example 1, except that the compound ozonized was 2-methyl-5-vinylpyridine (0.1 mole). Following the aforementioned work-up of Example 1, there was obtained 9.1 grams (75.2% yield) of 3-methylpyridine-5-aldehyde. An elemental analysis was obtained on the oxime, which melted at 160 to 162° C., and showed the following comparison: Calculated for $C_7H_8ON_2$: C, 61.73; H, 5.93; N, 20.58. Found: C, 61.57; H, 6.12; N, 20.34; C, 61.12; H, 6.35; N, 20.13.

The utility of the compounds produced in Examples 4 and 5 as an inhibitor for pickling solutions was shown by the following:

One-inch-square, 22-gauge, freshly-polished pieces of cold-rolled steel, after weighing, were suspended from nichrome wire in dilute hydrochloric-acid solution (10 weight percent) containing one weight percent (based on the weight of solution) of the test compounds.

The solutions, with the metal therein, were heated at 70° C. for 1.5 hours. The metal samples were then washed with ethanol, dried under an air blast, and weighed. The weight losses, the diminution of which was taken as the criterion of inhibitory action of the respective compounds tested, are tabulated below:

| Compound tested: | Percent weight Loss of metal |
|---|---|
| 1. No inhibitor added to pickling bath | 9.00 |
| 2. Rodine No. 213 (commercial inhibitor) | 0.07 |
| 3. 2-methylpyridine-5-aldehyde | 0.47 |
| 4. 5-ethylpyridine-2-aldehyde | 4.95 |

It will be evident from the foregoing that our invention provides a simple and efficient method for producing pyridine aldehydes at low cost.

While we have described the preferred practice of our invention, we intend to cover as well as any change or modification therein which may be made without departing from the spirit and scope of the invention.

We claim:

A method of making pyridine aldehydes which comprises dissolving a vinylpyridine selected from the group consisting of 2-vinylpyridine, 3-vinylpyridine, 4-vinylpyridine, 5-ethyl-2-vinylpyridine, 6-methyl-2-vinylpyridine and 2-methyl-5-vinylpyridine in a substantially anhydrous $C_1$ to $C_{10}$ monohydroxy aliphatic alcohol, passing ozone-containing gas through the solution while maintaining it at a temperature between $-100$ and $0°$ C., until from about 1 to 2 mols of ozone per mol of vinylpyridine has reacted with the vinylpyridine, then while the solution is still below $0°$ C., treating it with a reducing agent selected from the group consisting of sodium bisulphite and the iodides of ammonium, alkali and alkaline-earth metals and recovering from the solution the pyridine aldehyde thus formed.

References Cited in the file of this patent

Lenart: Ber. Deut. Chem., vol. 47, pages 808–9 (1914).
Harries: Liebigs Ann., vol. 410, page 96 (1915).
Henne et al: J. Am. Chem. Soc., vol. 65, pages 2183–5 (1943).
Bailey: Chem. Reviews, vol. 58, pages 990–1, (1958).